Patented Feb. 27, 1934

1,949,038

UNITED STATES PATENT OFFICE 1,949,038

REFRACTORY ARTICLE

Trevor M. Caven, New York, N. Y., assignor, by mesne assignments, to Corning Glass Works, Corning, N. Y., a corporation of New York No Drawing. Application February 10, 1927
Serial No. 167,368

9 Claims. (Cl. 106—9)

My invention relates to refractory articles and includes incorporating phosphorus preferably in the form of a phosphoric acid in said article to serve as a binding medium. If desired, the phosphorus may be incorporated directly in the shaped refractory article or it may be incorporated in a cement for binding said articles together.

Hitherto to cause refractory bricks or cements to set either a material which fluxes with the base or main constituent thereof or which acts as an envelope has been thought essential. So far as I am aware no refractory other than carborundum has been used in which a chemical as well as crystalline change takes place in setting. I have found that on such refractory oxides, or combination of oxides, as aluminum, chromium, magnesium, and zirconium, or on their combination with silica to form the silicates, it is possible to get a chemical reaction with phosphorus, preferably in the form of metaphosphoric acid. So far as I am aware this is new to the ceramic art. It has been extremely difficult to find a suitable binding medium for refractory oxide bricks or preformed shapes, and so far as I am aware refractory oxide cements have been impracticable, due to the failure to find a suitable binding medium.

The main object of my invention therefore is to provide a suitable binding medium for refractory articles, preferably refractory oxide articles, to be used in either holding the preformed shapes themselves together or in a cement therefor which would eliminate leakage troubles, some of the tongue and groove and shiplap joints formed in walls or linings constructed therefrom. Silica cement as formerly made, consisting of crushed silica, brickbats or raw ganister and a plastic silicious clay, does not bind silica bricks satisfactorily. It acts principally as a filler between the bricks and does not show much tendency to bond the bricks unless brought practically to the fusion or vitrification point. By incorporating phosphorus, preferably in the form of metaphosphoric acid, in the refractory article, I am able to form a binding medium for said articles which will satisfactorily function on the application of a heat thereto in excess of 200° C. only.

I have discovered that if the refractory oxide is grounded to a fine state of division, preferably 300 mesh, and then mixed with metaphosphoric acid in such proportions as to form phosphates, a very strong bonding action is the result, one which is stable at all temperatures up to the breakdown point of the oxide and in many cases even beyond the fusion point of the oxide.

Alumina is an example of such an oxide. If ground to 300 mesh, wet to a point of complete saturation with 85% metaphosphoric acid, preferably diluted to 30%, then heated to over 200° C., a hard mass is produced which is probably and aluminum phosphate, which does not break down in water and which withstands a slightly higher temperature than the oxide.

If desired to make a refractory shape or brick of aluminum oxide and phosphoric acid, I take 80% of the oxide ground to 16 mesh, add 20% of the same or similar oxide ground to 300 mesh to this and add thereto sufficient 85% meta phosphoric acid, preferably diluted to 30%, usually about 5% to react on the 20% of finely ground oxide to form a phosphate. I then heat to a point around 1500° C. in order to bring the coarse oxide to a point where it is stable under heat.

I have found from careful tests that I can make a refractory cement from aluminum, or other refractory oxide, in the same manner with the exception that I use a finer ground (100 mesh) material as a base in place of the coarse (16 mesh), and vary the amount of phosphoric acid according to the strength of bond desired. I have used this cement for the bonding of refractory shapes made of fused aluminum oxide (Norton's Alundum) with great success, and find that it stands higher temperatures than the material it is binding.

In the case of a cement, however, it will properly set if the temperature is only raised to 200° C. as the base is brought into a much finer state of subdivision.

In case I desire to use the aluminum silicates as a base, I find it desirable to grind them to as fine a state of subdivision as possible so all will pass through a 300 mesh sieve. I then add the phosphoric acid in such proportions as may be required to act on the predominating base element either silica or aluminum.

I have found that I can cause a reaction to take place on any of the refractory oxides, such as chromium, magnesium, or zirconium, in the same way as with aluminum, all acting in much the same way.

I have found that calcining the base materials, while it changes some of the physical structure, does not stop the chemical reaction.

I have found that the most important thing to do in bringing about the action between the refractory oxide and phosphoric acid is to have the refractory oxide as finely ground as is possible, preferably to a colloidal state, and the finer the refractory oxide the more rapid the reaction and stronger bond produced.

I employ the term "refractory brick" to include any preformed refractory shape whether it be in true rectangular form, or otherwise.

I employ the term "refractory oxide" to include refractory oxides used alone or in chemical combination with other acid or basic elements of a type only capable of reacting with phosphoric acid under the above conditions to produce a refractory article as specifically claimed.

It is understood that my invention is not limited to the specific embodiments described, and that various deviations may be made therefrom without departing from the spirit and scope of the appended claims.

What I claim is:

1. A refractory article consisting of relatively coarse refractory aluminum oxide grains and a binding medium consisting substantially of a refractory aluminum phosphate.

2. A refractory article consisting of refractory aluminum oxide grains and a binding medium consisting of a refractory aluminum phosphate.

3. The method of bonding aluminous refractory materials which includes forming in situ around each aluminous grain a thin film of aluminum phosphate.

4. The method of forming in situ around the grains of an aluminous refractory batch a thin film of aluminum phosphate which includes adding to the batch a small amount of only phosphoric acid.

5. The method of forming in situ around the grains of an aluminous refractory batch a thin film of aluminum phosphate which includes adding to the batch not more than 2% of only phosphoric acid.

6. A green refractory article containing aluminous material and made by adding to the batch sufficient phosphoric acid alone to form on the aluminous material of the raw batch a thin film of aluminum phosphate and molding the batch to the desired form.

7. The improved method of bonding aluminous refractory materials with phosphoric acid which includes adding to the refractory batch not more than 2% of phosphoric acid alone.

8. The method of bonding aluminous refractory materials which includes forming in situ around each aluminous grain a thin film of aluminum phosphate by reacting said grains with a small amount of phosphoric acid.

9. A green refractory article containing aluminous material bonded by the cohesion of thin films of aluminum phosphate surrounding the grains of said aluminous material.

TREVOR M. CAVEN.